US008608180B2

(12) United States Patent
Timtner et al.

(10) Patent No.: US 8,608,180 B2
(45) Date of Patent: Dec. 17, 2013

(54) CHUCK WITH JAWS MOVED RADIALLY OUTWARDLY FOR CLAMPING

(75) Inventors: Karlheinz Timtner, Bad Homburg (DE); Martin Rogalla, Darmstadt (DE)

(73) Assignee: Schenck RoTec GmbH, Darmstadt (DE)

( * ) Notice: Subject to any disclaimer, the term of this patent is extended or adjusted under 35 U.S.C. 154(b) by 771 days.

(21) Appl. No.: 12/807,490

(22) Filed: Sep. 7, 2010

(65) Prior Publication Data

US 2011/0057397 A1 Mar. 10, 2011

(30) Foreign Application Priority Data

Sep. 10, 2009 (DE) ..................... 20 2009 012 251 U
Oct. 26, 2009 (DE) ..................... 20 2009 014 451 U

(51) Int. Cl.
*B23B 31/30* (2006.01)
*B23B 31/167* (2006.01)

(52) U.S. Cl.
USPC ......... 279/2.09; 279/2.11; 279/4.04; 279/121

(58) Field of Classification Search
USPC .............. 279/2.09, 2.1, 2.11, 2.12, 2.13, 110, 279/121, 4.04, 4.12
IPC ................. B23B 31/30,31/167, 31/173, 31/177
See application file for complete search history.

(56) References Cited

U.S. PATENT DOCUMENTS

| | | | | | |
|---|---|---|---|---|---|
| 1,135,045 | A * | 4/1915 | Osterholm | 279/2.13 |
| 2,954,983 | A * | 10/1960 | Roby | 279/121 |
| 3,707,292 | A * | 12/1972 | Morawski et al. | 279/110 |
| 4,616,538 | A * | 10/1986 | Hessbruggen | 82/165 |
| 4,777,714 | A * | 10/1988 | Blessing | 82/142 |
| 6,116,617 | A * | 9/2000 | Kofler | 279/133 |
| 6,409,182 | B1 * | 6/2002 | Taglang | 279/132 |
| 7,415,766 | B2 * | 8/2008 | Luschei et al. | 29/894.3 |
| 2010/0090419 | A1 | 4/2010 | Monden et al. | |

FOREIGN PATENT DOCUMENTS

| | | | | |
|---|---|---|---|---|
| DE | 28 05 860 | | 8/1979 | |
| JP | 01264703 | A * | 10/1989 | B23B 31/16 |
| JP | 05096407 | A * | 4/1993 | B23B 31/173 |

* cited by examiner

*Primary Examiner* — Eric A Gates
(74) *Attorney, Agent, or Firm* — Collard & Roe, P.C.

(57) ABSTRACT

The invention relates to a chuck comprising a chuck casing (3) and jaws (1) moved radially outwardly and having an axially extending clamping face (17) for clamping a workpiece. The jaws (1) are guided in radial guides and are provided with two sloping guideways on an axially slidable clamping piece (4) is guided in such a manner that the jaws (1) are moved radially upon an axial sliding motion of the clamping piece (4). A jaw casing (2) accommodating the radial guides of the jaws (1) is carried for axial movement in the chuck casing (3) and is supported on the chuck casing (3) in the direction of the clamping movement of the clamping piece (4) via an axially resilient spring element (9).

13 Claims, 2 Drawing Sheets

CHUCK WITH JAWS MOVED RADIALLY OUTWARDLY FOR CLAMPING

CROSS REFERENCE TO RELATED APPLICATIONS

Applicants claim priority under 35 U.S.C. §119 of German Utility Model Application No. 20 2009 012 251.4 filed Sep. 10, 2009 and German Utility Model Application No. 20 2009 014 451.8 filed Oct. 26, 2009.

FIELD OF THE INVENTION

This invention relates to a chuck with jaws moved radially outwardly for clamping, the jaws having an axially extending clamping face, are guided in radial guides and axially supported and are provided with two sloping guideways on which guiding members of an axially slidable clamping piece are guided in such a manner that the jaws are moved radially on an axial sliding motion of the clamping piece.

DESCRIPTION OF RELATED ART

In a chuck of the type referred to as known from DE 28 05 860 C2, the jaws are radially guided in a casing having a round shoulder that may serve as an axial stop for a workpiece to be clamped. The jaws have rectangular, groove-shaped apertures formed in the sides for engagement with axial projections of a clamping piece. The projections have slopes extending parallel to each other and cooperate with inclined planes of the apertures in order to effect the clamping and unclamping movements of the jaws. The chuck casing is provided with a cylinder in which a piston of the clamping piece slides. The clamping movement of the clamping piece is produced by compression springs arranged in the clamp casing, while the unclamping movement is produced by pressure application of the piston.

SUMMARY OF THE INVENTION

It is an object of the present invention to provide a chuck of the type initially referred to which enables different workpieces with widely differing clamping diameters to be centrally located and clamped with precise accuracy. The chuck should be able to transmit high torques to the workpiece as are required, for example, for the balancing of passenger-car wheels. The changeover from one clamping diameter to another one should be possible within a relatively wide diameter range without the need to reset. The chuck should guarantee a high rotational accuracy and be able to find beneficial employment in balancing machines for the clamping of workpieces to be balanced.

This object is accomplished according to the invention with a chuck having the features indicated in claim 1. Advantageous embodiments of the chuck are recited in claims 2 to 8.

According to the invention, the chuck includes a jaw casing accommodating the radial guides of the jaws. The jaw casing is carried for axial movement in a chuck casing and is supported on the chuck casing in the direction of the clamping movement of the clamping piece via an axially resilient spring element. In addition, the chuck casing is provided with a plane engaging surface for a workpiece to be clamped. In the chucking device of the invention, when a workpiece is clamped the supporting force acting in opposition to the clamping force of the clamping piece is transmitted from the chuck casing via the resilient spring element to the jaw casing and from there to the jaws. Due to the resulting deformation of the spring element, the jaw casing with the jaws guided therein is displaced relative to the chuck casing, whereby during the clamping action the workpiece is pressed against the plane engaging face of the chuck casing with increasing pressure as the clamping force increases.

According to another embodiment of the invention, the jaws may have a curved clamping face whose radius of curvature varies continuously in the circumferential direction, with the radius of curvature being at a maximum in the middle of the clamping face and decreasing continuously in the circumferential direction towards the two edges of the clamping face down to a minimum radius of curvature which corresponds to the smallest workpiece bore diameter to be clamped. This results in a favorable snug fit of the clamping faces onto varying bore diameters of workpieces to be clamped.

Furthermore, the clamping faces of the jaws may be inclined relative to the axis of the chuck such that the distance of the clamping faces relative to the axis increases towards the free end of the jaws, with in particular the inclination of the clamping faces relative to the axis amounting to substantially 0.5°. By virtue of this technique, it is possible to increase the radial clamping force and the pressure application against the plane face and hence the transmittable torque significantly. In addition, the edge of the workpiece bore adjacent to the plane face remains free from damage.

Another advantage is to have the plane engaging face formed in the manner of a flat, frusto-conical depression whose depth increases from without to within. For example, the depth of the depression may be such that a radial straight line touching the plane engaging face intersects the axis of the chuck essentially at an angle of 89.5°. Owing to this form of the plane engaging face, the workpiece makes engagement with the plane face always with the maximum possible contact diameter so that a maximum possible moment of friction can be transmitted. To increase the friction moment, it is furthermore possible for the plane engaging face to be coated with a material that increases the coefficient of friction.

According to another proposal of the invention, provision may be made for a pneumatic actuating device with a cylinder, a double-acting piston dividing the cylinder into two cylinder chambers, and an inner guide with a bore, said bore accommodating a pressure-sensitive slide valve which opens when the piston is acted upon in the direction of the releasing movement of the chuck and connects the cylinder chamber containing compressed air with an inner air duct that is connected to vent openings in the clamping area of the chuck. This enables cleaning of the clamping area with air exiting from the vent openings without this function requiring an additional air connection.

BRIEF DESCRIPTION OF THE DRAWINGS

The present invention will be explained in more detail in the following with reference to an embodiment illustrated in the accompanying drawings. In the drawings.

DETAILED DESCRIPTION OF THE EMBODIMENT

Figure 1:
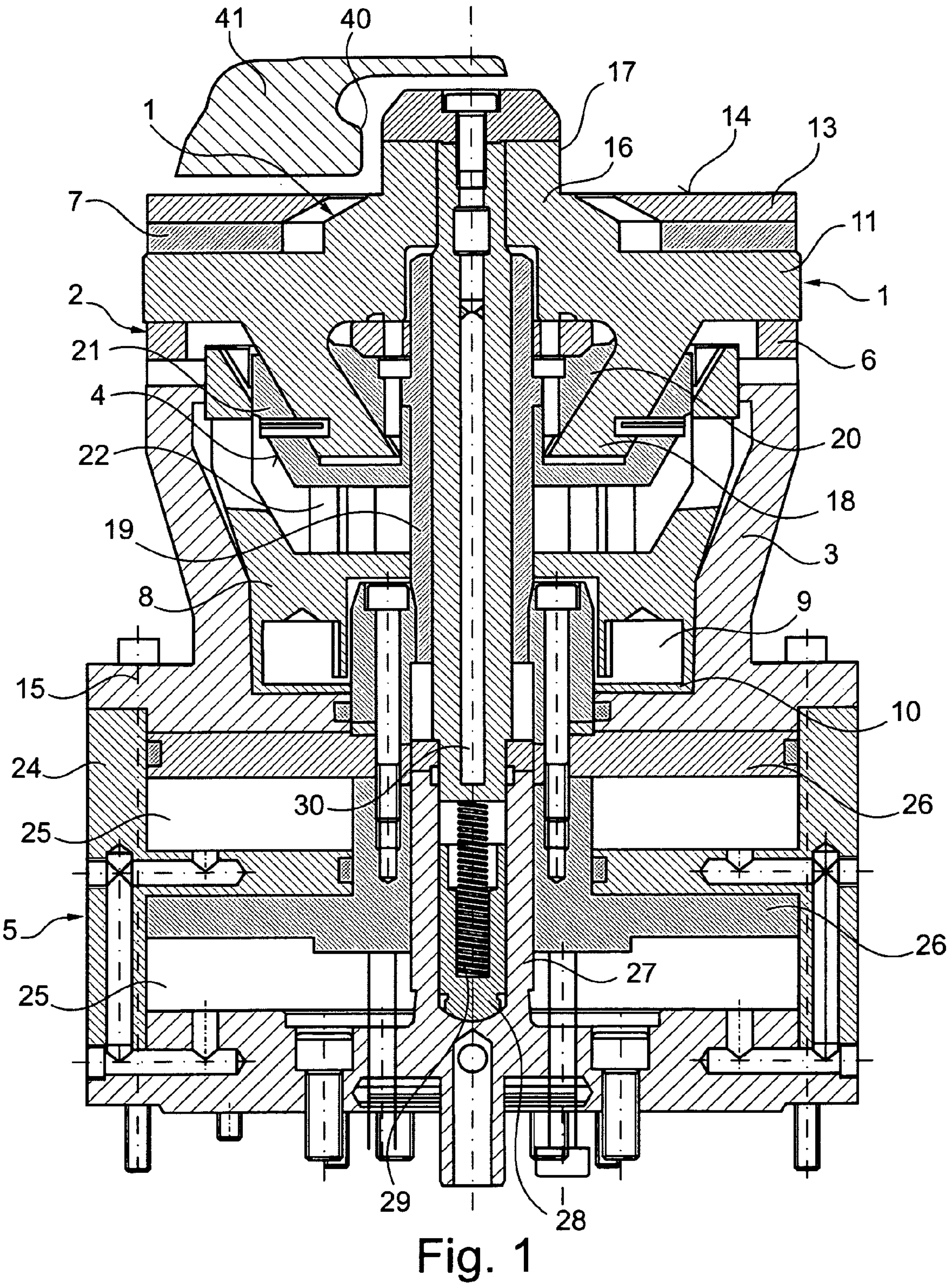
FIG. 1 is a cross-sectional view of a chuck of the invention.

The chuck shown comprises hook-shaped jaws 1, a jaw casing 2, a chuck casing 3, a clamping piece 4 and a pneumatic actuating device 5. The jaw casing 2 is composed of a guiding body 6, a cover plate 7 and a cup-shaped spring housing 8. The guiding body 6 has twelve radiating guide slots with parallel walls having between each two one jaw 1 radially guided with a right-parallelepipedal guide section 11. The cover plate 7 closes the slots in axial direction and serves as abutment for the jaws 1 when the chuck is released. The spring housing 8 is held in the chuck casing 3 with allowance for a small amount of play. On its side facing away from the guiding body it includes a plurality of cylindrical spring chambers in which axially biased springs 9 are received. The springs 9 bear against a stop disk 10 arranged on the bottom 15 of the chuck casing 3.

The chuck casing 3 has at its end close to the jaws arms 12 which extend through a respective recess provided between two jaw guides of the guiding body 6. Secured to the ends of the arms 12 by screws is a stop plate 13 having an outer plane engaging face 14, extending radially to the axis of the jaw casing 2. The stop plate 13 also serves as a support for the jaw casing 2 against the biasing force of the springs 9 when the chuck is in a released position.

The jaws 1 have at their radial inner end a clamping section 16 which extends outwardly in axial direction through central openings in the cover plate 7 and the stop plate 13 and includes a curved clamping face 17 on the side facing away from the chuck axis. The curvature of the clamping face 17 has a continuously varying curvature radius in order to achieve a best possible snug fit with varying diameters of workpiece bores. The curvature radius is at its maximum in the middle of the clamping face 17 and decreases continuously in the circumferential direction towards the two edges of the clamping face to a minimum curvature radius which corresponds to the smallest workpiece bore diameter to be clamped. On the side facing away from the cover plate 7, the jaws 1 have a clamping hook 18 of rectangular cross-section which extends downwardly and inwardly from the guide section 11 of the jaw 1 through an aperture in the guiding body 6 at an angle of 30° to the axis of the chuck. The clamping hooks 18 cooperate with the clamping piece 4 which includes an inner lying clamping polyhedron 20 and a bell-shaped clamping member 21 embracing the clamping hooks 18 from without, both parts being secured to a central actuating tube 22. The actuating tube 22 is connected to the actuating device 5 which is arranged on the bottom 15 of the chuck casing 3. The actuating device 5 is comprised of a pneumatically driven tandem cylinder 24 with two cylinder chambers 25 and a tandem piston 26 which is bolted to the actuating tube 22.

When the clamping polyhedron 20 is moved in the direction of the actuating device 5 by the tandem piston 26, the hook-shaped jaws 1 are moved radially outwardly. The clamping action starts as soon as the clamping faces 17 of the jaws 1 touch the bore 40 of a workpiece 41. When the actuating force is increased, the jaws 1 are pressed axially against the guide in the guiding body 6 of the jaw casing 2 which transmits the pressure to the springs 9 that bear against the chuck casing 3 via the stop disk 10 and hence against the tandem cylinder 24. The pressure acts to compress the springs 9 until the jaw casing engages the stop disk 10 firmly. As this occurs, the clamping faces 17 of the jaws 1 slide into the bore 40 of the workpiece 41, the resulting friction force urging the contact face of the workpiece 41 against the plane engaging face 14 of the stop plate 13. With the springs 9 and the thickness of the stop plate 13 suitably selected, it is possible to adjust the magnitude of the axial pressure force within wide limits.

Following engagement of the jaw casing 2 with the stop disk 10, the jaws 1 slide no longer axially in the bore 40. By increasing the actuating force further up to a maximum value, the effect of friction between the clamping face 17 and the bore 40 is further increased. In the clamped condition thus achieved, the torque transmittable from the chuck to the workpiece 41 is determined, on the one hand, by the friction produced by the workpiece being pressed against the plane engaging face 14, and by the friction between the workpiece bore 40 and the clamping faces 17 on the other hand. In contrast to known chucks where the jaws are pressed against the workpiece bore only in radial direction, in the chuck of the invention the additional pressing action between workpiece and plane engaging face results in quite a significant increase in the transmittable torque because not only is an additional friction force generated but also the effective friction diameter on the plane engaging face 14 is as a rule considerably larger than the diameter of the clamped workpiece bore. In order to increase the friction moment between the stop plate 13 and the workpiece still further, the plane engaging face 14 of the stop plate 13 may be coated with a material that increases the coefficient of friction.

Figure 2:
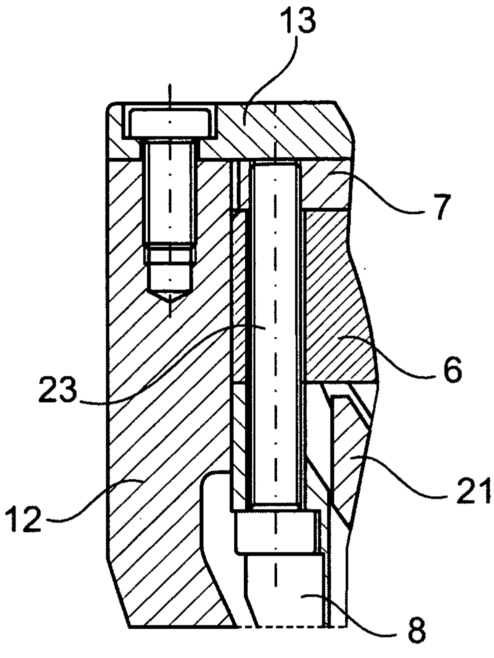
FIG. 2 is a part-sectional view of the chuck of FIG. 1.

As becomes apparent from FIG. 2, the stop plate 13 is bolted to the arms 12 of the chuck casing 3 and, as the cover plate 7, is connected to the guiding body 6 and the spring housing 8 by screws 23.

Figure 3:
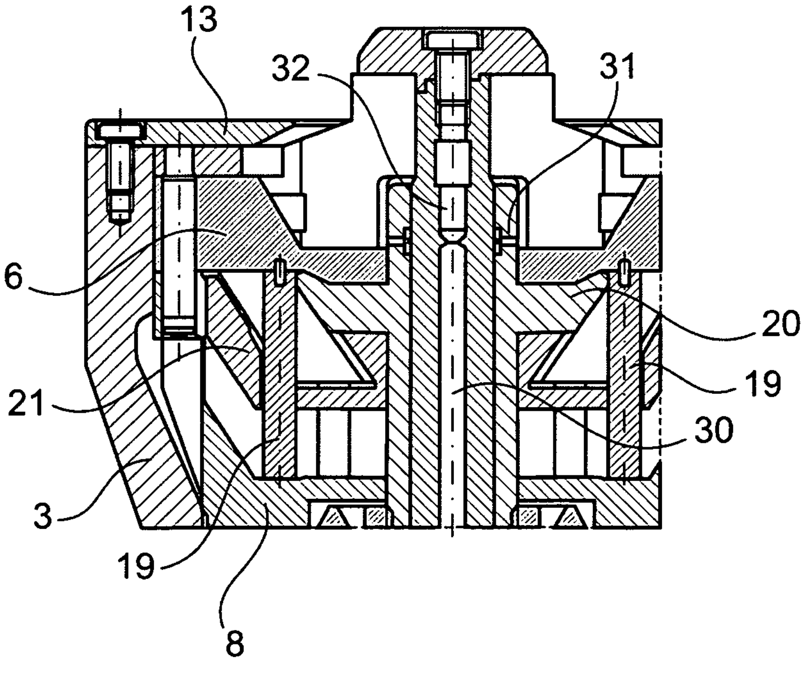
FIG. 3 is another part-sectional view of the chuck of FIG. 1.

The chuck is also provided with an air supply for the removal of dust and debris upon completion of the clamping operation. Received in the bore of an inner guide 27 is a control piston 28 which is urged downwardly by a spring 29 during the clamping operation and in the state of rest. On release by the application of pressure to the side of the tandem piston 26 remote from the chuck casing 3, the air pressure moves the control piston 28 upwards, whereby channels are opened through which air is admitted into a central air bore 30. As shown in FIG. 3, the air flows through vent openings 31 to effect cleaning of the clamping area. The amount of outflowing air can be metered by a throttle screw 32.

FIG. 3 also shows that the guiding body 6 is supported against the spring housing 8 by a plurality of bolts 19 arranged on the circumference axially. This keeps deformation of the guiding body 6 at a minimum and enables the guiding body 6 to be designed with a very short axial length. In the absence of a support by means of the bolts 19, the guiding body 6 would have to be substantially thicker axially, with the result that the entire chuck would be built to a greater height.

The chuck described is primarily suitable for clamping workpieces in balancing machines. It has the advantage of enabling the clamping of bores varying in diameter up to 60% without the need of resetting the chuck. The chuck is therefore suited to flexible manufacturing with short cycle times as demanded in particular in automobile assembly. Furthermore, the long distance traveled by the jaws allows a large clearance for workpiece introduction, thereby facilitating automatic loading of the chuck. The chuck is able to transmit a comparatively high torque to a workpiece. Therefore, it enables short starting and deceleration times of workpieces with a large moment of inertia without the risk of the workpiece slipping on the chuck. A high rotational accuracy is achieved by the workpiece being pressed on axially. Moreover, the chuck is characterized by building to a short overall length in the clamping area. This also enables workpieces with blind-end bores of little depth to be clamped. While the embodiment of the clamping device described has a pneumatic actuating device, it will be understood that hydraulic or mechanical actuating devices may equally find beneficial usage.

What is claimed is:

1. A chuck having chuck casing with an axis and jaws moved radially outwardly for clamping a workpiece, the jaws having an axially extending clamping face, are guided in radial guides and axially supported and are provided with two sloping guideways on which guiding members of an axially slidable clamping piece are guided in such a manner that the jaws are moved radially on an axial sliding motion of the clamping piece, wherein the radial guides of the jaws are accommodated in a jaw casing which is carried for axial movement in the chuck casing and is supported on the chuck casing in the direction of the clamping movement of the clamping piece via an axially resilient spring element, with the chuck casing including a plane engaging surface for axially engaging a workpiece to be clamped.

2. The chuck according to claim 1, wherein the jaws have a curved clamping face whose radius of curvature varies continuously in the circumferential direction, with the radius of curvature being at a maximum in the middle of the clamping face and decreasing continuously in the circumferential direction towards the two edges of the clamping face down to a minimum radius of curvature which corresponds to the smallest workpiece bore diameter to be clamped.

3. The chuck according to any one of the claims 1 or 2, wherein the clamping faces of the jaws are inclined relative to the axis of the chuck such that the distance of the clamping faces relative to the axis increases towards the free end of the jaws.

4. The chuck according to claim 3, wherein the inclination of the clamping faces relative to the axis amounts to substantially 0.5°.

5. The chuck according to claim 1, wherein the plane engaging surface is formed in the manner of a flat, frusto-conical depression whose depth increases from without to within.

6. The chuck according to claim 5, characterized in that a radial straight line touching the plane engaging face intersects the axis of the chuck essentially at an angle of 89.5°.

7. The chuck according to claim 1, wherein the plane engaging surface is coated with a material that increases the coefficient of friction.

8. The chuck according to claim 1, wherein the jaw casing includes a guiding body, a cover plate and a cup-shaped spring housing, said guiding body having radiating guide slots with parallel walls having between each two one jaw radially guided with a right-parallelepipedal guide section.

9. The chuck according to claim 8, wherein the guiding body is supported against the spring housing by a plurality of bolts arranged on the circumference axially.

10. The chuck according to claim 1, wherein the chuck casing has at its end close to the jaws arms which extend through a respective recess provided between two jaw guides of the guiding body, there being secured to the ends of the arms a stop plate having an outer plane engaging face for the workpiece.

11. The chuck according to claim 10, wherein there are a plurality of axially resilient spring elements, and the spring elements are biased and the jaw casing takes support on the stop plate against the biasing force of the spring elements.

12. The chuck according to claim 1, further comprising an air supply for the removal of dust and debris upon completion of a clamping operation.

13. The chuck according to claim 12, further comprising a pneumatic actuating device with a cylinder, a double-acting piston dividing the cylinder into two cylinder chambers, and an inner guide with a bore, said bore accommodating a pressure-sensitive slide valve which opens when the piston is acted upon in the direction of the releasing movement of the chuck and connects the cylinder chamber containing compressed air with an inner air duct that is connected to vent openings in the clamping area of the chuck.

* * * * *